(12) United States Patent
Bhandaru et al.

(10) Patent No.: US 10,554,574 B2
(45) Date of Patent: Feb. 4, 2020

(54) RESOURCE MANAGEMENT TECHNIQUES FOR HETEROGENEOUS RESOURCE CLOUDS

(71) Applicant: INTEL CORPORATION, Santa Clara, CA (US)

(72) Inventors: Malini K. Bhandaru, San Jose, CA (US); Yunhong Jiang, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 71 days.

(21) Appl. No.: 14/752,733

(22) Filed: Jun. 26, 2015

(65) Prior Publication Data

US 2016/0380911 A1    Dec. 29, 2016

(51) Int. Cl.
*H04L 12/911* (2013.01)

(52) U.S. Cl.
CPC .................. *H04L 47/781* (2013.01)

(58) Field of Classification Search
CPC ... H04L 47/781; H04L 41/5054; H04L 67/10; H04W 28/16
See application file for complete search history.

(56) References Cited

U.S. PATENT DOCUMENTS

| | | | | |
|---|---|---|---|---|
| 2006/0047813 A1* | 3/2006 | Aggarwal | ........... | H04L 67/1008 709/226 |
| 2009/0138883 A1* | 5/2009 | McLean | ................... | G06F 9/50 718/104 |
| 2009/0198769 A1* | 8/2009 | Keller | ..................... | H04L 67/34 709/203 |
| 2009/0199175 A1* | 8/2009 | Keller | ..................... | G06F 8/61 717/178 |
| 2011/0179041 A1 | 7/2011 | Souto et al. | | |
| 2013/0073713 A1 | 3/2013 | Stelmar Netto | | |
| 2013/0111468 A1 | 5/2013 | Davis et al. | | |
| 2015/0113144 A1 | 4/2015 | Bauer et al. | | |

OTHER PUBLICATIONS

International Search Report and Written Opinion received for PCT Patent Application No. PCT/US2016/034478, dated Aug. 30, 2016, 12 pages.
European Search Report and Written Opinion for the European Patent Application No. EP16814988, dated Feb. 13, 2019.

* cited by examiner

*Primary Examiner* — Philip J Chea
*Assistant Examiner* — Mohammed Ahmed

(57) ABSTRACT

Resource management techniques for heterogeneous resource clouds are described. In one embodiment, for example, an apparatus may comprise logic, at least a portion of which is implemented in hardware, the logic to comprise an administration component to maintain a cloud resource information database for a heterogeneous resource cloud and an allocation component to generate an ordered unified feature list based on feature preference information associated with a request for a virtual appliance service, iteratively prune an available resource pool of the heterogeneous resource cloud based on the ordered unified feature list to obtain a candidate resource set, and allocate one or more resources among the candidate resource set to the virtual appliance service. Other embodiments are described and claimed.

22 Claims, 11 Drawing Sheets

| Specifier | Desired Features |
|---|---|
| user | f3, f7 |
| SLA level | f1, f4 |
| vendor | f5 |

*610*

| Feature | FSRC |
|---|---|
| f1 | 6 |
| f3 | 10 |
| f4 | 3 |
| f5 | 12 |
| f7 | 5 |

*620*

| Feature | FSRC |
|---|---|
| f4 | 3 |
| f7 | 5 |
| f1 | 6 |
| f3 | 10 |
| f5 | 12 |

Storage Medium 900

Computer Executable Instructions for 300

Computer Executable Instructions for 400

Computer Executable Instructions for 500

Computer Executable Instructions for 700

Computer Executable Instructions for 800

RESOURCE MANAGEMENT TECHNIQUES FOR HETEROGENEOUS RESOURCE CLOUDS

TECHNICAL FIELD

Embodiments herein generally relate to the provision of virtual appliance services using hardware resources of heterogeneous resource clouds.

BACKGROUND

A heterogeneous resource cloud generally comprises a set of physical resources of multiple types that can be leveraged to provide desirable services to end users. A virtual appliance is one example of such a potentially desirable service. Generally speaking, a virtual appliance is a pre-configured emulation of an electronic device or system, such as a computer, workstation, server, router, switch, hard drive, or disk array, for example. In response to a request for a particular virtual appliance service, a cloud service provider may select resources from among those of a heterogeneous resource cloud and use the selected resources to provide the request service. The cloud service provider may typically benefit from some degree of flexibility with respect to such resource selection—there may be numerous resources within a given heterogeneous resource cloud that can be used to perform the necessary emulation. However, depending on the nature of the device to be emulated, the requirements/preferences of the end user and/or virtual appliance vendor, the requirements of any applicable service level agreement (SLA), and/or other factors, there may also be constraints on the resources that can be used to provide any particular virtual appliance service.

BRIEF DESCRIPTION OF THE DRAWINGS

FIG. 6 illustrates an embodiment of a feature list.
FIG. 9 illustrates an embodiment of a storage medium.

DETAILED DESCRIPTION

Various embodiments may be generally directed to resource management techniques for heterogeneous resource clouds. In one embodiment, for example, an apparatus may comprise logic, at least a portion of which is implemented in hardware, the logic to comprise an administration component to maintain a cloud resource information database for a heterogeneous resource cloud and an allocation component to generate an ordered unified feature list based on feature preference information associated with a request for a virtual appliance service, iteratively prune an available resource pool of the heterogeneous resource cloud based on the ordered unified feature list to obtain a candidate resource set, and allocate one or more resources among the candidate resource set to the virtual appliance service. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
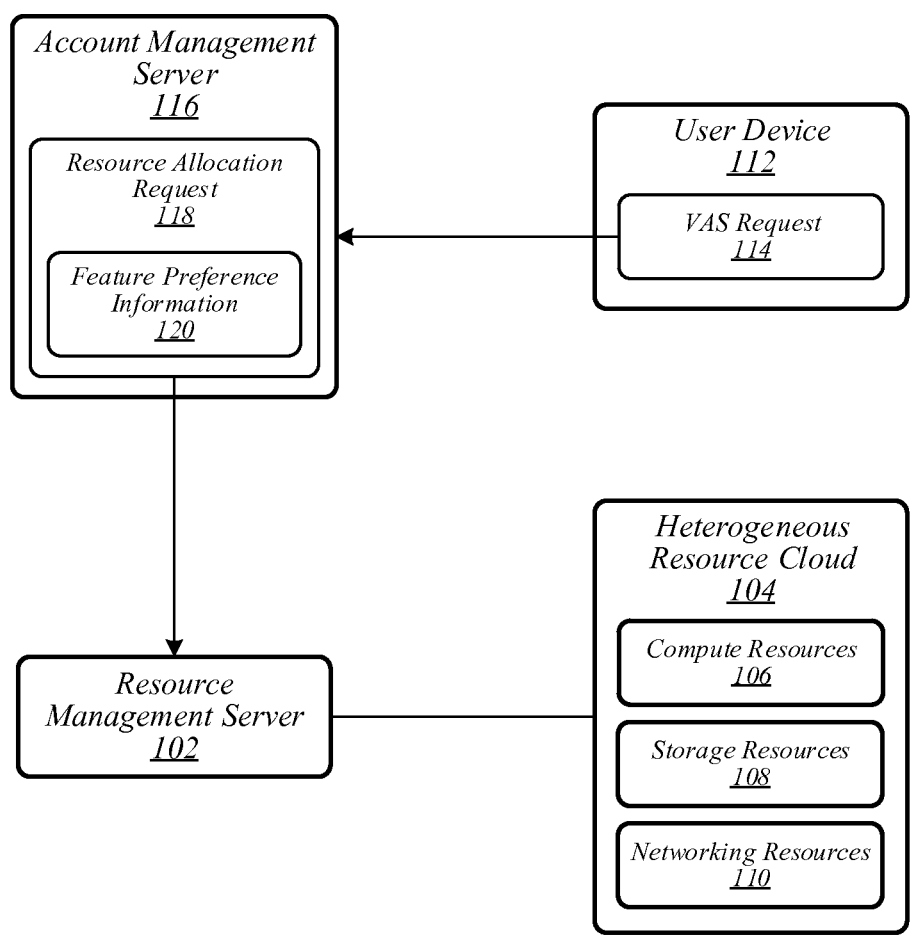
FIG. 1 illustrates an embodiment of an operating environment.

FIG. 1 illustrates an example of an operating environment 100 that may be representative of various embodiments. Shown in operating environment 100 are a resource management server 102, a heterogeneous resource cloud 104, a user device 112, and an account management server 116. Resource management server 102 is generally operative to manage the allocation of various resources of heterogeneous resource cloud 104 in conjunction with the provision of virtual appliance services. Heterogeneous resource cloud 104 comprises multiple classes of resources, which include compute resources 106, storage resources 108, and networking resources 110. Compute resources 106 may generally comprise hardware capable of performing computing and/or processing tasks. Examples of compute resources 106 may include—without limitation—processors and microcontrollers. Storage resources 108 may generally comprise hardware capable of storing data and/or information. Examples of storage resources 108 may include—without limitation—hard disks, tape storage devices, and solid-state drives. Networking resources 110 may generally comprise hardware capable of performing/supporting network communication operations. Examples of networking resources 110 may include—without limitation—network switches, hubs, routers, bridges, gateways, and repeaters. It is worthy of note that in some embodiments, heterogeneous resource cloud 104 may additionally or alternatively include one or more other types of resources. For example, in various embodiments, heterogeneous resource cloud 104 may include one or more power resources, such as power supplies, batteries, and/or power control/management devices. The embodiments are not limited to this example.

In operating environment 100, account management server 116 may generally be operative to receive user requests for virtual appliance services and communicate with resource management server 102 to request that resources of heterogeneous resource cloud 104 be allocated in order to enable provision of the requested virtual appliance services. In some embodiments, account management server 116 may be operated by a virtual appliance vendor. In various such embodiments, the virtual appliance vendor may comprise a different entity than an operator of resource management server 102 and/or heterogeneous resource cloud 104. For example, in some embodiments, a cloud resource provider that operates resource management server 102 and heterogeneous resource cloud 104 may provide access to resources of heterogeneous resource cloud 104 to multiple virtual appliance vendors, including a virtual appliance vendor that operates account management server 116.

In various other embodiments, account management server 116, resource management server 102, and heterogeneous resource cloud 104 may be operated by a same entity, such as a same virtual appliance vendor. The embodiments are not limited in this context.

In operating environment 100, a virtual appliance service request (VAS request) 114 is sent from user device 112 to account management server 116 in order to request the provision of a virtual appliance service. VAS request 114 may comprise information indicating a type of virtual appliance that is desired, and may also comprise information describing various other characteristics of the desired virtual appliance. In some embodiments, VAS request 114 may include information indicating one or more feature preferences to be observed in conjunction with selection of hardware resources to be used to provide the virtual appliance service. Such feature preferences may apply to one or more types of resources within heterogeneous resource cloud 104, such as one or more of compute resources 106, storage resources 108, and networking resources 110. In various embodiments, each such feature preference may comprise a requirement or preference that a particular feature be possessed by a resource or set of resources that is ultimately allocated for use to provide the virtual appliance service. For example, a given feature preference may comprise a requirement or preference that a compute resource 106 featuring an x86 architecture be allocated for use to provide the virtual appliance service. The embodiments are not limited to this example.

In response to receipt of VAS request 114, account management server 116 may send a resource allocation request 118 to resource management server 102. Resource allocation request 118 may generally comprise a request for allocation of resources of heterogeneous resource cloud 104 for the purpose of providing a virtual appliance service to user device 112. In order to notify resource management server 102 of any feature preferences that are to be observed in conjunction with the selection of the resources to be allocated, account management server 116 may include feature preference information 120 within resource allocation request 118. Feature preference information 120 may generally comprise information specifying—or usable to identify—one or more feature preferences applicable to the prospective resources to be used to provide the virtual appliance service.

In some embodiments, feature preference information 120 may include information specifying—or usable to identify—one or more user-indicated feature preferences. In various embodiments, each user-indicated feature preference may comprise a feature preference that was specified in conjunction with the use of user device 112 to request the virtual appliance service to be provided. In some embodiments, account management server 116 may identify one or more user-indicated feature preferences based on information contained in VAS request 114, and may include information specifying those one or more user-indicated feature preferences within feature preference information 120. For example, in various embodiments, a list of desired features may be input/generated at user device 112 in conjunction with requesting the virtual appliance service to be provided, VAS request 114 may contain information identifying those desired features, and account management server 116 may identify those desired features and include information identifying those desired features within feature preference information 120. The embodiments are not limited to this example.

In some embodiments, feature preference information 120 may additionally or alternatively include information specifying—or usable to identify—one or more service level agreement (SLA)-indicated feature preferences. In various embodiments, each SLA-indicated feature preference may comprise a feature preference that is defined by—or otherwise arises from—an SLA according to which the virtual appliance service is to be provided. In some embodiments, the SLA may comprise an agreement between an entity that owns/operates user device 112 and a virtual appliance vendor that operates account management server 116. In various embodiments, upon receipt of VAS request 114, account management server 116 may identify an SLA to which user device 112 is subject, determine one or more SLA-indicated feature preferences based on the identified SLA, and include information specifying those one or more SLA-indicated feature preferences within feature preference information 120. The embodiments are not limited to this example.

In some embodiments, according to an applicable SLA, an owner/operator/user of user device 112 may be entitled to a particular one of multiple defined levels of service. In an example embodiment, resource management server 102 may allocate resources of heterogeneous resource cloud 104 for provision of virtual appliance services in accordance with defined Platinum, Gold, and Silver service levels, and an owner/operator/user of user device 112 may subscribe to the Gold service level. In various embodiments, each such service level may map to one or more particular SLA-indicated feature preferences, which may be associated with one or more types of resources of heterogeneous resource cloud 104. For example, a Platinum service level may map to feature preferences indicating that an allocated compute resource is to support Advanced Vector Extensions 2 (AVX2) and that an allocated storage resource is to comprise storage in a solid-state device (SSD). The embodiments are not limited to these examples.

In some embodiments, feature preference information 120 may additionally or alternatively include information specifying—or usable to identify—one or more vendor-indicated feature preferences. In various embodiments, each vendor-indicated feature preference may comprise a feature preference that is stipulated by a virtual appliance vendor that operates account management server 116 and provides the requested virtual appliance service to user device 112. In some embodiments, each vendor-indicated feature preference may stipulate a feature that is necessary or desirable in order to optimize the performance, reliability, and/or other relevant characteristics of the virtual appliance service. In various embodiments, one or more vendor-indicated feature preferences may correspond to virtual appliance image constraints. In such embodiments, each virtual appliance image constraint may comprise a requirement or preference associated with a virtual appliance image to be used to launch a virtual appliance instance in order to provide the virtual appliance service. Examples of such requirements or preferences in some embodiments may include—without limitation—large page table support and non-uniform memory access (NUMA) memory support. In various embodiments, upon receipt of VAS request 114, account management server 116 may identify one or more features that are necessary or desirable in order to optimize the performance, reliability, and/or other relevant characteristics of the virtual appliance service to be provided to user device 112 by a vendor operating account management server 116, and may include information specifying those one or more vendor-indicated feature preferences within feature preference information 120. The embodiments are not limited to this example.

In response to receipt of resource allocation request 118, resource management server 102 may allocate resources of heterogeneous resource cloud 104 for use in providing the requested virtual appliance service to user device 112. In order to select the resources that are to be allocated, resource management server 102 may perform a resource selection procedure. During the resource selection procedure, resource management server 102 may select resources from among heterogeneous resource cloud 104 based at least in part on feature preferences that it identifies via reference to feature preference information 120. In some embodiments, resource management server 102 may receive resource allocation requests on an ongoing basis, and may perform the resource selection procedure each time it receives such a request. If the resource selection procedure is slow, significant scheduling latency may result, especially in large-scale cloud deployment environments in which frequent requests may be received for allocation of resources from among hundreds or thousands comprised in a heterogeneous resource cloud. Such latency may negatively impact the quality of the virtual appliance services that are provided.

Disclosed herein are resource management techniques for heterogeneous resource clouds that may be applied in various embodiments in order to efficiently allocate resources for use in providing virtual appliance services. According to some such techniques, information describing the resources of a heterogeneous resource cloud may be compiled and structured in such a way as to enable fast and efficient allocation of cloud resources for use in the provision of virtual appliance services. In various embodiments, in response to receipt of a resource allocation request, a resource management server such as resource management server 102 may generate a combined list of desired features based on feature preferences of one or more types, which may include one or more of user-indicated feature preferences, SLA-indicated feature preferences, and vendor-indicated feature preferences. In some embodiments, the resource management server may then select resources for allocation according to a resource selection procedure that comprises iteratively pruning an available resource pool based on the combined list of desired features. In various embodiments, the combined list of desired features may be structured in such a way that the iterative pruning rapidly narrows the pool of candidate resources, enabling the resource selection procedure to be completed quickly. In some embodiments, implementation of the disclosed techniques may reduce scheduling latency and positively impact the user experience with respect to the provision of virtual appliance services.

Figure 2:
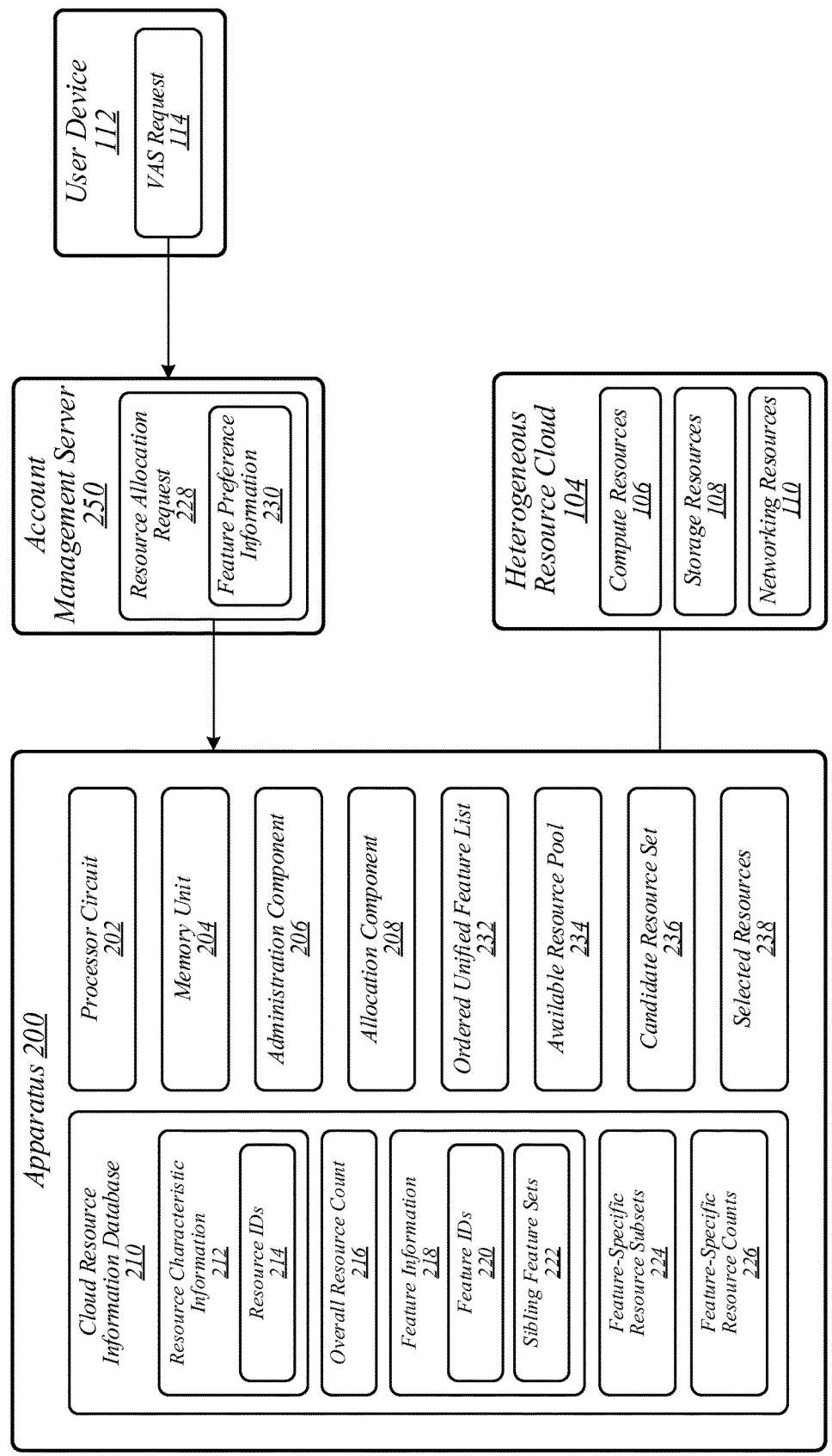
FIG. 2 illustrates an embodiment of an apparatus.

FIG. 2 illustrates a block diagram of an apparatus 200 that may implement resource management techniques for heterogeneous resource clouds in various embodiments. In some embodiments, apparatus 200 may be representative of resource management server 102 of FIG. 1. As shown in FIG. 2, apparatus 200 comprises multiple elements including a processor circuit 202, a memory unit 204, a registration component 206, and an allocation component 208. The embodiments, however, are not limited to the type, number, or arrangement of elements shown in this figure.

In various embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In some embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in various embodiments. The embodiments are not limited in this context.

In some embodiments, apparatus 200 may comprise an administration component 206. Administration component 206 may comprise logic, circuitry, and/or instructions operative to track and/or analyze the composition of heterogeneous resource cloud 104 and the characteristics and/or features associated with the various resources comprised therein. In various embodiments, administration component 206 may be operative to maintain a database of information generally describing various properties, characteristics, and/or features of heterogeneous resource cloud 104 and/or of resources comprised within heterogeneous resource cloud 104. In some embodiments, administration component 206 may be operative to employ a registration procedure to register new resources as they are added to heterogeneous resource cloud 104. In various embodiments, administration component 206 may be operative to employ a deregistration procedure to deregister resources as they are removed from heterogeneous resource cloud 104. The embodiments are not limited in this context.

In some embodiments, apparatus 200 may comprise an allocation component 208. Allocation component 208 may comprise logic, circuitry, and/or instructions operative to allocate cloud resources to virtual appliance services. In various embodiments, allocation component 208 may generally be operative to perform cloud resource allocation based on information in the aforementioned database that may be maintained by administration component 206. In some embodiments, allocation component 208 may generally be operative to perform cloud resource allocation in response to received allocation requests. The embodiments are not limited in this context.

During general operation, apparatus 200 may be operative to manage the provision of virtual appliance services using resources of heterogeneous resource cloud 104. In various embodiments, administration component 206 may be operative to maintain a cloud resource information database 210 for use in conjunction with such management. In some embodiments, allocation component 208 may be operative to allocate resources of heterogeneous resource cloud 104 based on information comprised in cloud resource information database 210. In various embodiments, cloud resource information database 210 may be structured in such a way as to enable allocation component 208 to make allocation decisions quickly and efficiently. The embodiments are not limited in this context.

In some embodiments, administration component 206 may be operative to maintain resource characteristic information 212, some or all of which may be comprised within cloud resource information database 210. In various embodiments, resource characteristic information 212 may comprise information describing respective characteristics of the various resources comprised in heterogeneous resource cloud 104. In some embodiments, resource characteristic information 212 may specify a unique respective resource identifier (ID) 214 for each resource in heterogeneous resource cloud 104. In various embodiments, resource characteristic information 212 may include information indicating other respective characteristics of resources comprised in heterogeneous resource cloud 104. In some embodiments, for example, resource characteristic information 212 may include information indicating, for each resource ID 214, a location of the respective resource that corresponds to that resource ID 214. The embodiments are not limited to this example.

In various embodiments, administration component 206 may be operative to maintain an overall resource count 216, which may be comprised within cloud resource information database 210. In some embodiments, overall resource count 216 may comprise a monotonically increasing parameter, the value of which—at any particular point in time—may indicate a total number of unique resources of heterogeneous resource cloud 104 that have been registered for potential use in the provision of virtual appliance services. In various embodiments, each time a new resource is added to heterogeneous resource cloud 104, overall resource count 216 may be incremented and a resource ID 214 may be assigned to the new resource based on the incremented value of overall resource count 216. For example, if a new resource is added to heterogeneous resource cloud 104 at a time at which overall resource count 216 is equal to 5, overall resource count 216 may be incremented to a value of 6, and the new resource may be assigned a resource ID 214 comprising the value "r6". The embodiments are not limited to this example.

In some embodiments, such as in the preceding example, the value of overall resource count 216 at a given point in time may generally correspond to a resource ID 214 associated with a most recently registered resource of heterogeneous resource cloud 104. It is worthy of note that in various embodiments, such as those in which previously registered resources have since been removed from heterogeneous resource cloud 104, the actual number of resources of heterogeneous resource cloud 104 that are available for use in the provision of virtual appliance services at a given point in time may be less than the value of overall resource count 216. For example, if six resources r1-r6 have been registered for heterogeneous resource cloud 104, but resources r2 and r4 have since been removed from heterogeneous resource cloud 104, then overall resource count 216 may comprise a value of 6 when the actual number of resources in heterogeneous resource cloud 104 is only four. In some embodiments, when a resource is removed from heterogeneous resource cloud 104, the resource ID 214 for that resource may be removed from resource characteristic information 212. Thus, in the context of the preceding example, overall resource count 216 may comprise a value of 6 when resource characteristic information 212 only contains the resource IDs r1, r3, r5, and r6. The embodiments are not limited to this example.

In various embodiments, administration component 206 may be operative to maintain feature information 218, some or all of which may be comprised within cloud resource information database 210. In some embodiments, feature information 218 may comprise information describing various features that may be possessed by resources of heterogeneous resource cloud 104. In various embodiments, feature information 218 may specify a respective feature ID 220 for each such feature. In some embodiments, each time a new feature is identified, a unique feature ID 220 may be assigned to that new feature. In various embodiments, the assignments of feature IDs 220 may be conducted according to a procedure analogous to that used for resource ID assignments, such that feature IDs 220 are assigned based on a monotonically-increasing feature count. For example, in some embodiments, a first identified feature may be assigned a feature ID of f1, a second identified feature may be assigned a feature ID of f2, and so forth. In the remaining discussion, in the interest of clarity and simplicity, it shall be assumed that these example formats and assignment schemes for resource IDs 214 and feature IDs 220 are being used. However, it is to be appreciated that other formats and assignment schemes are both possible and contemplated, and that the embodiments are not limited to these examples.

In various embodiments, feature information 218 may identify one or more sibling feature sets 222. In some embodiments, each sibling feature set 222 may comprise a respective set of feature IDs corresponding to features that comprise alternative possible values of a same characteristic parameter. For example, if a feature f3 corresponds to a first possible geographic location of a hypothetical resource and a feature f7 corresponds to a second possible geographic location of the hypothetical resource, a sibling feature set 222 may be defined that comprises the feature f3 and f7. The embodiments are not limited in this context.

In various embodiments, administration component 206 may be operative to maintain one or more feature-specific resource subsets 224, some or all of which may be comprised within cloud resource information database 210. In some embodiments, each feature-specific resource subset 224 may comprise a subset of the set of resource IDs 214 in resource characteristic information 212, and may thus identify and/or correspond to a subset of the resources comprised in heterogeneous resource cloud 104. In various embodiments, the resource IDs contained in any particular feature-specific resource subset 224 may comprise the respective resource IDs for all of the resources in heterogeneous resource cloud 104 that possess a particular corresponding feature. For example, if a feature f4 corresponds to an x86 architecture and heterogeneous resource cloud 104 contains three hardware resources r3, r5, and r8 that possess x86 architectures, then a feature-specific resource subset 224 for the feature f4 may contain the resource IDs r3, r5, and r8. In some embodiments, the respective resource IDs in each feature-specific resource subset 224 may appear in decreasing order, such that a highest resource ID appears first and a lowest resource ID appears last. The embodiments are not limited in this context.

In various embodiments, administration component 206 may be operative to maintain one or more feature-specific resource counts 226, some or all of which may be comprised within cloud resource information database 210. In some embodiments, each feature-specific resource count 226 may indicate a number of resources within heterogeneous resource cloud 104 that possess a respective corresponding feature. In various embodiments, each feature-specific resource count 226 may correspond to a respective feature-specific resource subset 224. In some such embodiments, each feature-specific resource count 226 may indicate a number of resources within heterogeneous resource cloud 104 that possess a feature associated with a respective corresponding feature-specific resource subset 224, and thus may also indicate a number of resource IDs comprised within that feature-specific resource subset 224. Continuing with the previous example in which the feature-specific resource subset 224 for the x86 architecture feature f4 contains the resource IDs r3, r5, and r8, a feature-specific resource count 226 corresponding to that feature-specific resource subset 224 may comprise a value of 3, indicating both that heterogeneous resource cloud 104 comprises three resources possessing x86 architectures and that the feature-specific resource subset 224 comprises three resource IDs. The embodiments are not limited to this example.

In various embodiments, administration component 206 may be operative to maintain one or more feature-specific resource subsets 224—and one or more associated feature-specific resource counts 226—that correspond to compound features. In some embodiments, each compound feature may be defined as the possession of at least one feature among a respective set of two or more features. In various embodiments, the feature-specific resource subset 224 for any given compound feature may comprise the resource IDs for all resources that possess at least one of the two or more features associated with that compound feature. For example, if a particular compound feature is defined as the possession of at least one of features f5 and f8, then the feature-specific resource subset 224 for that compound feature may comprise the resource IDs for all resources that possess feature f5, feature f8, or both. It is worthy of note that in some embodiments, rather than being maintained on an ongoing basis, feature-specific resource subsets 224 for compound features may be dynamically generated as needed. The embodiments are not limited in this context.

In various embodiments, administration component 206 may be operative to maintain one or more feature-specific resource subsets 224—and one or more associated feature-specific resource counts 226—that correspond to compound features that it defines based on the terms of one or more SLAs. In some embodiments, administration component 206 may define such compound features to correspond to sets of feature options associated with various SLA levels. For example, if subscribers to a Gold service level are entitled to allocation of dual-core or quad-core compute resources, administration component 206 may define a given compound feature as the possession of a dual-core or quad-core architecture. Administration component 206 may then maintain a feature-specific resource subset 224 corresponding to that defined compound feature such that it contains the resource IDs of all compute resources featuring dual-core or quad-core architectures. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
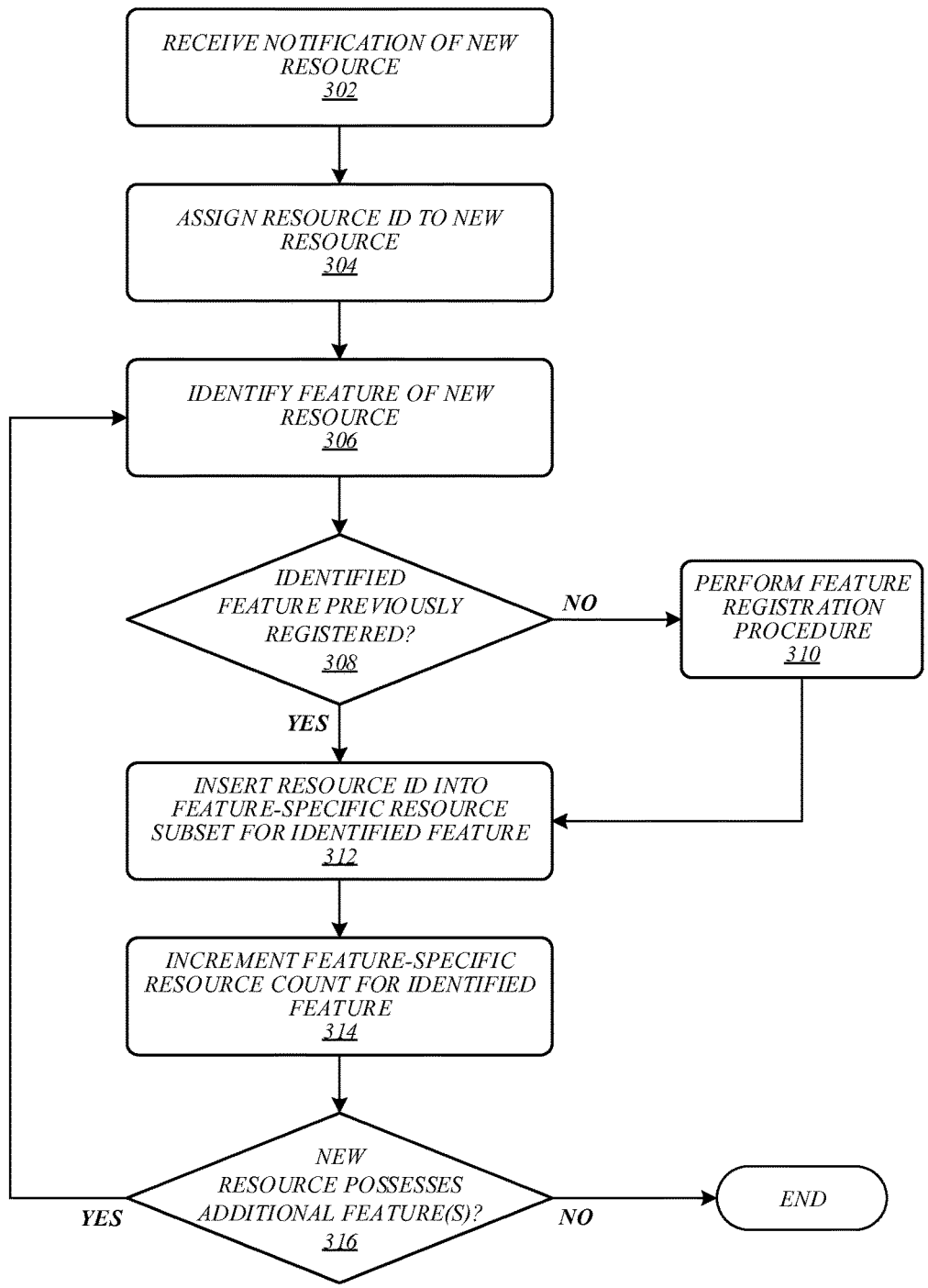
FIG. 3 illustrates an embodiment of a first logic flow.

FIG. 3 illustrates an example of a logic flow 300 that may be representative of a resource registration procedure that apparatus 200 of FIG. 2 may perform in various embodiments in conjunction with the incorporation of a new resource into heterogeneous resource cloud 104. As shown in FIG. 3, a notification of a new resource may be received at 302. For example, apparatus 200 of FIG. 2 may receive a notification indicating that a resource has been added to heterogeneous resource cloud 104. At 304, a resource ID may be assigned to the new resource. For example, administration component 206 of FIG. 2 may increment overall resource count 216 and assign a resource ID 214 to a new resource based on the incremented overall resource count 216. At 306, a feature of the new resource may be identified. For example, administration component 206 of FIG. 2 may identify a feature of a new resource of heterogeneous resource cloud 104.

At 308, it may be determined whether the identified feature has previously been registered. For example, administration component 206 of FIG. 2 may determine whether an identified feature of a new resource in heterogeneous resource cloud 104 has previously been registered. If it is determined that the identified feature has not previously been registered, flow may pass to 310. At 310, a feature registration procedure may be performed to register the identified feature. For example, administration component 206 of FIG. 2 may perform a feature registration procedure to register an identified feature of a new resource in heterogeneous resource cloud 104. From 310, flow may pass to 312. If it is determined at 308 that the identified feature has previously been registered, flow may pass directly from 308 to 312.

At 312, a resource ID of the new resource may be inserted into a feature-specific resource subset for the identified feature. For example, administration component 206 of FIG. 2 may insert a resource ID 214 for a new resource of heterogeneous resource cloud 104 into a feature-specific resource subset 224 for an identified feature of that new resource. In some embodiments, the resource ID may be inserted at the front of the feature-specific resource subset, such that the inserted resource ID comprises the first element in the feature-specific resource subset. At 314, a feature-specific resource count for the identified feature may be incremented. For example, administration component 206 of FIG. 2 may increment a feature-specific resource count 226 for an identified feature of a new resource of heterogeneous resource cloud 104. At 316, it may be determined whether the new resource possesses any additional features. If it is determined that the new resource possesses one or more additional features, flow may return to 306, where another feature of the new resource may be identified. If it is determined at 316 that the new resource does not possess any additional features, the logic flow may end. The embodiments are not limited to these examples.

Figure 4:
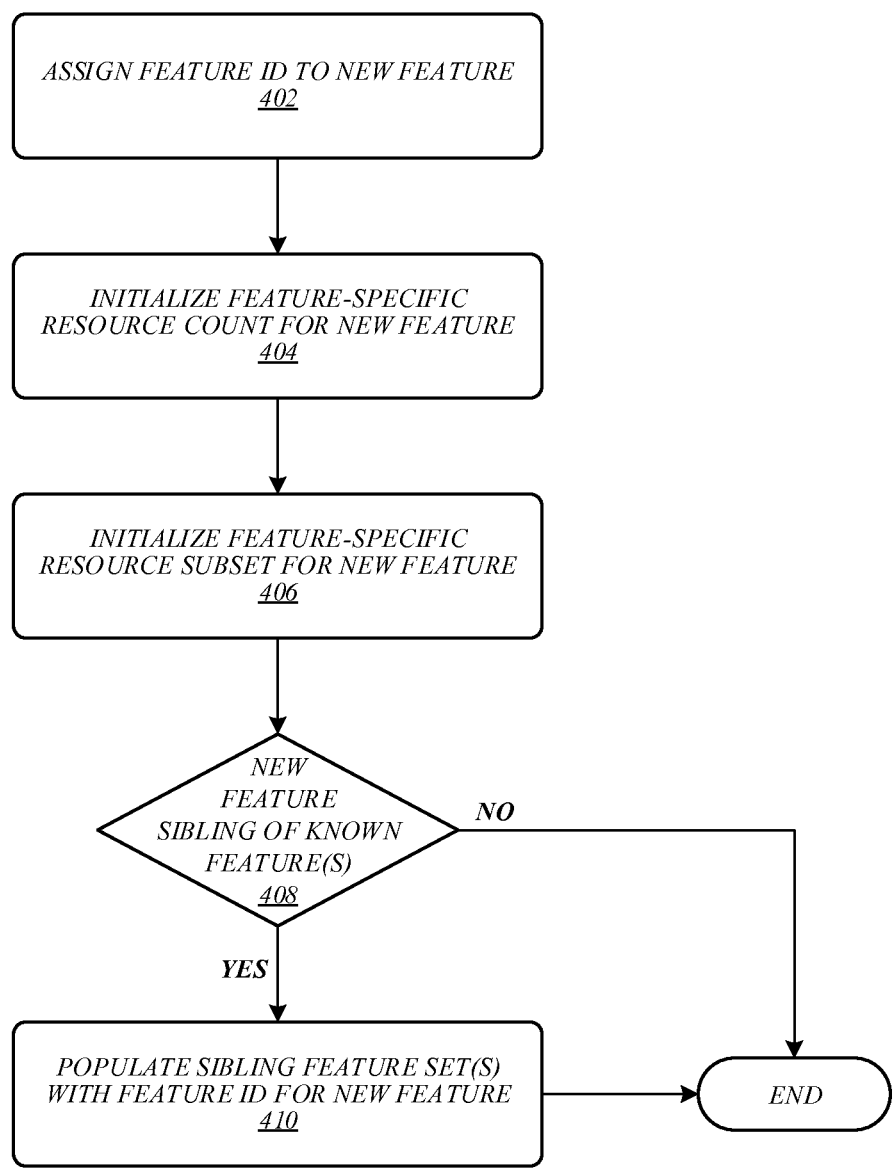
FIG. 4 illustrates an embodiment of a second logic flow.

FIG. 4 illustrates an example of a logic flow 400 that may be representative of a feature registration procedure that apparatus 200 of FIG. 2 may perform in various embodiments in response to the identification of a new feature. Logic flow 400 may be representative of the feature registration procedure that may be performed at block 310 in logic flow 300 of FIG. 3 according to some embodiments. As shown in FIG. 4, a feature ID may be assigned to a new feature at 402. For example, administration component 206 of FIG. 2 may assign a feature ID 220 to a new feature that it identifies while registering a new resource of heterogeneous resource cloud 104. At 404, a feature-specific resource count for the new feature may be initialized. For example, administration component 206 of FIG. 2 may initialize a feature-specific resource count 226 for a new feature. In various embodiments, the feature-specific resource count for the new feature may be initialized with a value of 0.

At 406, a feature-specific resource subset for the new feature may be initialized. For example, administration component 206 of FIG. 2 may initialize a feature-specific resource subset 224 for a new feature. In some embodiments, the feature-specific resource subset may be initialized as an empty/null set. At 408, it may be determined whether the new feature is a sibling of any known features. For example, administration component 206 of FIG. 2 may determine whether a new feature is a sibling of any features that is has previously registered. If it is determined at 408 that the new feature is a sibling of one or more known features, flow may pass to 410. At 410, one or more sibling feature sets may be populated with the feature ID of the new feature. For example, administration component 206 of FIG. 2 may insert a feature ID 220 for a new feature into one or more sibling feature sets 222. Following 410, the logic flow may end. If it is determined at 408 that the new feature is not a sibling of any known features, the logic flow may end. The embodiments are not limited to these examples.

Figure 5:
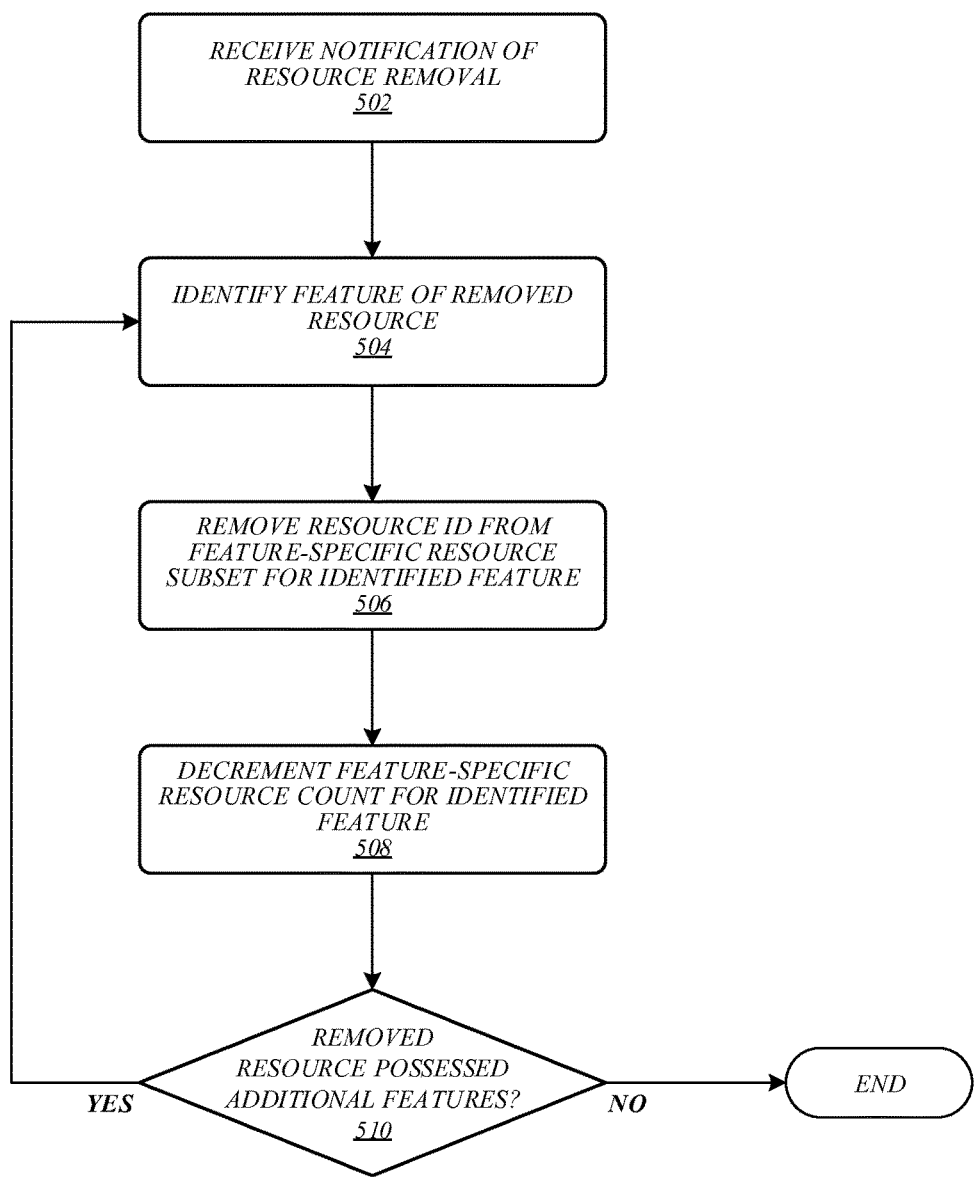
FIG. 5 illustrates an embodiment of a third logic flow.

FIG. 5 illustrates an example of a logic flow 500 that may be representative of a resource deregistration procedure that apparatus 200 of FIG. 2 may perform in various embodiments in conjunction with the removal of a resource from heterogeneous resource cloud 104. As shown in FIG. 5, a notification of a resource removal may be received at 502. For example, apparatus 200 of FIG. 2 may receive a notification indicating that a resource has been removed from heterogeneous resource cloud 104. At 504, a feature of the removed resource may be identified. For example, administration component 206 of FIG. 2 may identify a feature of a resource that has been removed from heterogeneous resource cloud 104.

At 506, a resource ID of the removed resource may be removed from a feature-specific resource subset for the identified feature. For example, administration component 206 of FIG. 2 may remove a resource ID 214 of a removed resource from a feature-specific resource subset 224 for an identified feature of the removed resource. At 508, a feature-specific resource count for the identified feature may be decremented. For example, administration component 206 of FIG. 2 may decrement a feature-specific resource count 226 for an identified feature of a removed resource. At 510, it may be determined whether the removed resource possessed any additional features. If it is determined that the removed resource possessed one or more additional features, flow may return to 504, where another feature of the removed resource may be identified. If it is determined at 510 that the removed resource did not possess any additional features, the logic flow may end.

Returning to FIG. 2, in some embodiments, apparatus 200 may receive a resource allocation request 228 from an external device. In various embodiments, resource allocation request 228 may comprise a request for allocation of resources of heterogeneous resource cloud 104 for use in providing a virtual appliance service. In some embodiments, apparatus 200 may receive resource allocation request 228 from a node responsible for receiving and servicing VAS requests, such as account management server 116 of FIG. 1. In various embodiments, such a node may receive a VAS request such as VAS request 114 of FIG. 1 from a client/user device such as user device 112 of FIG. 1, and may send resource allocation request 228 to apparatus 200 in response to receipt of the VAS request. In some embodiments, resource allocation request 228 may comprise feature preference information 230. In various embodiments, feature preference information 230 may comprise information specifying one or more feature requirements/preferences to be observed in conjunction with allocating resources of heterogeneous resource cloud 104 for use in providing the virtual appliance service. In some embodiments, feature preference information 230 may specify feature requirements and/or preferences that apply to one or more types of resources within heterogeneous resource cloud 104, such as one or more of compute resources 106, storage resources 108, and networking resources 110. In various embodiments, feature preference information 230 may include information specifying—or usable to identify—one or more user-indicated feature preferences, one or more SLA-indicated feature preferences, and/or one or more vendor-indicated feature preferences. In some embodiments, feature preference information 230 may be the same as—or similar to—feature preference information 120 of FIG. 1. The embodiments are not limited in this context.

It is worthy of note that the example of FIG. 2—in which feature preference information 230 is depicted as being entirely contained within a resource allocation request 228 sent by an account management server 116—is merely exemplary, and the embodiments are not limited to this example. In various embodiments, some or all of feature preference information 230 may be provided to apparatus 200 by user device 112 directly, rather than via account management server 116. In some embodiments, apparatus 200 may generate some or all of feature preference information 230 itself, based on other information received from one or both of user device 112 and account management server 116. In an example embodiment, rather than identifying SLA-indicated features based on a service level applicable to a virtual appliance service to be provided to user device 112 according to an SLA, account management server 116 may simply notify apparatus 200 of the applicable service level. Allocation component 208 may then identify one or more SLA-indicated features for use in providing the virtual appliance service according to the applicable service level and generate feature preference information 230 that indicates those one or more SLA-indicated features. The embodiments are not limited to this example.

In various embodiments, allocation component 208 may generate an ordered unified feature list based on feature preference information 230. In some embodiments, ordered unified feature list 232 may comprise a list of the desired features with respect to the cloud resources to be used to provide a virtual appliance service. In various embodiments, the features listed in ordered unified feature list 232 may include one or more of user-indicated features, SLA-indicated features, and vendor-indicated features. In some embodiments, the features listed in ordered unified feature list 232 may additionally or alternatively include desired features that have been identified and/or specified at/by one or more other entities, devices, node, and/or sources. The embodiments are not limited in this context.

In various embodiments, the features in ordered unified feature list 232 may be listed in order of their relative scarcity among the resources of heterogeneous resource cloud 104. In some such embodiments, the features may be listed in an order of most-scarce to least-scarce. In various embodiments, a most scarce feature within ordered unified feature list 232 may comprise a feature that is possessed by a smallest number of resources within heterogeneous resource cloud 104. Likewise, a least scarce feature may comprise a feature that is possessed by a greatest number of resources within heterogeneous resource cloud 104. In some embodiments, allocation component 208 may sort the features within ordered unified feature list 232 based on their respective feature-specific resource counts 226, such that a feature for which the feature-specific resource count 226 is lowest appears first in the ordered unified feature list 232, and a feature for which the feature-specific resource count 226 is highest appears last. The embodiments are not limited in this context.

FIG. 6 illustrates example tables 600, 610, and 620 that may be representative of information that may be used to generate an ordered unified feature list 630 in an example embodiment. Ordered unified feature list 630 may be representative of a ordered unified feature list 232 that allocation component 208 of FIG. 2 may generate based on feature preference information 230 in various embodiments. In FIG. 6, table 600 identifies various desired features, which include features specified by multiple respective sources. Table 600 may be representative of information that may be comprised in feature preference information 230 of FIG. 2 according to some embodiments. In the example of FIG. 6, table 600 identifies user-indicated features f3 and f7, SLA-indicated features f1 and f4, and a vendor-indicated feature f5. Table 610 identifies the collective set of features contained in table 600, in ascending order with respect to their feature IDs. The feature IDs in table 610 may be representative of feature IDs 220 of FIG. 2 according to various embodiments. Table 610 also indicates—for each such feature—a respective feature-specific resource count (FSRC). The FSRC values in table 610 may be representative of values of feature-specific resource counts 226 of FIG. 2 according to some embodiments. In the example of FIG. 6, the FSRCs for features f1, f3, f4, f5, and f7 are 6, 10, 3, 12, and 5, respectively.

Table 620 comprises the same feature IDs and FSRCs as does table 610, but lists these values in a different order. More particularly, in table 620, the feature-FSRC pairs of table 610 appear in order of relative scarcity, according to their respective FSRC values. The lowest FSRC value of 3 and its corresponding feature ID f4 appear first in table 620, while the highest FSRC value of 12 and its corresponding feature ID f5 appear last in table 620. The reordering reflected in table 620 in comparison to table 610 may be representative of sorting that allocation component 208 of FIG. 2 may perform in various embodiments in order to generate ordered unified feature list 232. Ordered unified feature list 630 is a set comprising the feature IDs of table 620, in the order in which they appear in table 620. The feature ID f4, which corresponds to the feature having the lowest associated FSRC, appears first in ordered unified feature list 630. Likewise, the feature ID f5, which corresponds to the feature having the highest associated FSRC, appears last in ordered unified feature list 630. The embodiments are not limited to these examples.

Returning to FIG. 2, in some embodiments, allocation component 208 may apply an iterative resource selection procedure in conjunction with selecting resources from among those of heterogeneous resource cloud 104 for allocation to a virtual appliance service to be provided to user device 112. In various embodiments, the iterative resource selection procedure may generally involve identifying an available resource pool 234 and iteratively pruning the available resource pool 234 based on an ordered unified feature list 232 to obtain a candidate resource set 236. In some embodiments, in applying the iterative resource selection procedure in conjunction with selecting one or more particular resources, allocation component 208 may identify available resource pool 234 based on a type of the resource (s) to be selected. In various embodiments, allocation component 208 may identify available resource pool 234 as the set of available resources of the type to be selected. For example, in conjunction with applying the iterative resource selection procedure in conjunction with selection of a compute resource, allocation component 208 may identify available resource pool 234 as the collective set of all compute resources 106 comprised in heterogeneous resource cloud 104 that are not already in use and are available for allocation. In various embodiments, allocation component 208 may repeat the iterative resource selection procedure for each type of resource that needs to be allocated to a virtual appliance service. For example, allocation component 208 may perform the iterative resource selection procedure a first time to identify a candidate resource set 236 of compute resources, a second time to identify a candidate resource set 236 of storage resources, and a third time to identify a candidate resource set 236 of networking resources, and may then allocate one or more resources from among each such candidate resource set 236 to a virtual appliance service that requires resources of all three types. The embodiments are not limited to this example.

In some embodiments, a first iteration of the iterative pruning of available resource pool 234 may comprise identifying a feature-specific resource subset 224 for a first feature in ordered unified feature list 232 and generating a pruned version of available resource pool 234 as an intersection of the identified feature-specific resource subset 224 with the initial version of available resource pool 234. In various embodiments, each successive iteration of the iterative pruning may comprise identifying a next feature-specific resource subset 224 associated with a next successive feature in ordered unified feature list 232 and generating a next pruned version of available resource pool 234 as an intersection of the previous pruned version of available resource pool 234 with the next feature-specific resource subset 224. In some embodiments, allocation component 208 may identify candidate resource set 236 as the set of resources comprised in the pruned version of available resource pool 234 that remains following the last iteration of the iterative pruning of available resource pool 234. The embodiments are not limited in this context.

In various embodiments, allocation component 208 may perform the iterative resource selection procedure in order to generate a candidate resource set 236 from which to select a single selected resource 238. In some other embodiments, allocation component 208 may perform the iterative resource selection procedure in order to generate a candidate resource set 236 from which to select multiple selected resources 238. In various embodiments, following generation of candidate resource set 236, allocation component 208 may proceed based on the size of candidate resource set 236 in comparison to the number of resources to be selected therefrom. In some embodiments, if candidate resource set 236 comprises a same number of resources as the number that are to be selected therefrom, allocation component 208 may simply identify the resource(s) comprised in candidate resource set 236 as the selected resource(s) 238. For example, if allocation component 208 performs the iterative resource selection procedure for the purpose of selecting two resources and candidate resource set 236 comprises two resources, allocation component 208 may identify the two resources in candidate resource set 236 as selected resources 238. The embodiments are not limited to this example.

In various embodiments, if candidate resource set 236 comprises a greater number of resources than are to be selected, allocation component 208 may initiate a procedure for selecting the desired number of resources from among those comprised in candidate resource set 236. In some embodiments, allocation component 208 may simply randomly select the desired number of resources from among those comprised in candidate resource set 236. In various other embodiments, allocation component 208 may select the desired number of resources from among those comprised in candidate resource set 236 based on one or more suitability criteria such as available excess capacity or cost. In yet other embodiments, allocation component 208 may randomly select a subset of candidate resource set 236, and may then select the desired number of resources from among that subset based on one or more suitability criteria. In some embodiments, allocation component 208 may select the desired number of resources from among candidate resource set 236—or a subset thereof—by determining suitability metrics for candidate resources as weighted sums/combinations of metrics corresponding to various such suitability criteria. The embodiments are not limited in this context.

In various embodiments, performing iterative pruning based on an ordered unified feature list 232 in which the scarcest features appear first may cause the most restrictive feature requirements to be taken into account first, enabling rapid pruning of the overall resource search space and faster servicing of resource allocation requests. In some embodiments, additional speed and/or efficiency improvement may be realized by ordering feature-specific resource subsets 224 in such a way as to enable the aforementioned set intersections to be computed more quickly. For example, in various embodiments, as noted above, the respective resource IDs in each feature-specific resource subset 224 may appear in decreasing order, such that a highest resource ID appears first and a lowest resource ID appears last. In some embodiments, this convention may permit some comparison operations to be skipped in conjunction with the computation of set intersections.

In an example embodiment, a resource set $R_{f1}$ may comprise a feature-specific resource subset 224 for a feature f1, and a resource set $R_{f2}$ may comprise a feature-specific resource subset 224 for a feature f2. $R_{f1}$ may comprise the resources {r100, r91, r90, r88, r50}, and $R_{f2}$ may comprise the resources {r99, r91, r88, r49, r40, r3, r2}. Because of the convention according to which these resource IDs appear in decreasing order, allocation component 208 may not need to compare the resource ID r100 in $R_{f1}$ to each resource ID in $R_{f2}$ in order to determine whether r100 is to be comprised in the intersection of these two sets. Instead, allocation component 208 may be able to determine that r100 is not to be comprised in the intersection of $R_{f1}$ and $R_{f2}$ based simply on a determination that the first resource ID in $R_{f2}$—r99—is lower than r100, and thus that each remaining resource ID in $R_{f2}$ is also lower than r100. Likewise, in searching within $R_{f2}$ for a match for the resource ID r50 comprised in $R_{f1}$, allocation component 208 may be able to stop searching once it reaches the resource ID r49 in $R_{f2}$, since each remaining resource ID must be less than r49 and thus not equal to r50. The embodiments are not limited to these examples.

Figure 7:
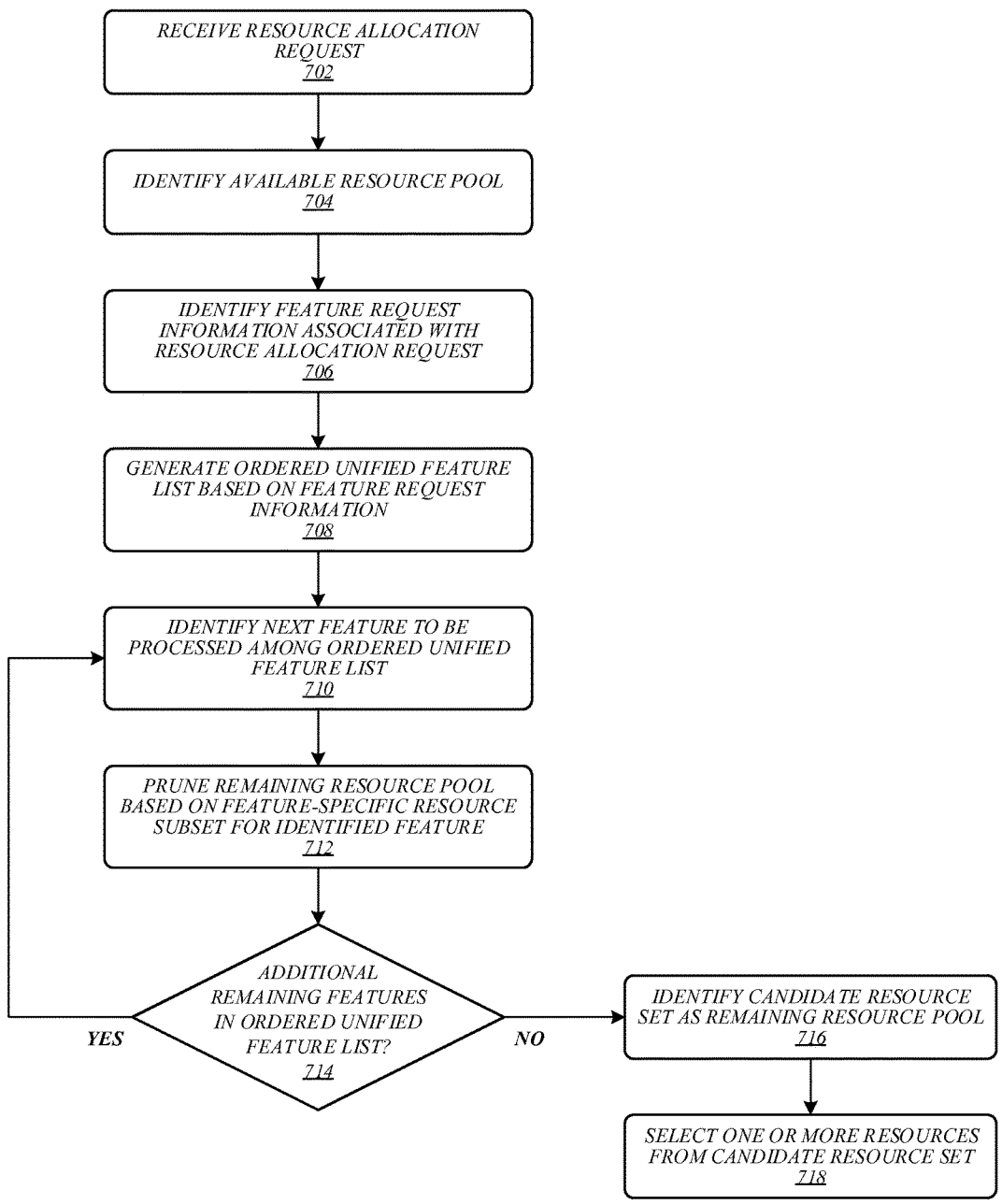
FIG. 7 illustrates an embodiment of a fourth logic flow.

FIG. 7 illustrates an example of a logic flow 700 that may be representative of an iterative resource selection procedure that apparatus 200 of FIG. 2 may perform in various embodiments in order to generate a candidate resource set from among which to select one or more resources for allocation to a virtual appliance service. As shown in FIG. 7, a resource allocation request may be received at 702. For example, apparatus 200 of FIG. 2 may receive resource allocation request 228. At 704, an available resource pool may be identified. In some embodiments, the available resource pool may be identified based on a type of a resource to be allocated in response to the resource allocation request received at 702. For example, having determined to allocate one or more storage resources in response to receipt of resource allocation request 228, allocation component 208 of FIG. 2 may identify an available resource pool 234 comprising available storage resources 108 within heterogeneous resource cloud 104.

At 706, feature preference information associated with the resource allocation request received at 702 may be identified. For example, allocation component 208 of FIG. 2 may identify feature preference information 230 associated with resource allocation request 228. In various embodiments, such feature preference information may include feature preference information comprised in the received resource allocation request. In some embodiments, such feature preference information may additionally or alternatively include feature preference information received in—or generated based on information comprised in—one or more other received messages. At 708, an ordered unified feature list may be generated based on the identified feature preference information. For example, allocation component 208 of FIG. 2 may generate ordered unified feature list 232 based on feature preference information 230. In various embodiments, the features comprised in the ordered unified feature list may be listed in order of their relative scarcity, from most-scarce to least-scarce. For example, allocation component 208 of FIG. 2 may construct ordered unified feature list 232 such that a scarcest feature appears first within ordered unified feature list 232 and a least scarce feature appears last within ordered unified feature list 232. In some embodiments, the order of the features comprised in the ordered unified feature list may be determined based on their respective feature-specific resource counts. For example, allocation component 208 of FIG. 2 may determine the order in which features are listed in ordered unified feature list 232 based on the respective feature-specific resource counts 226 for those features.

At 710, a feature among those comprised in the ordered unified feature list generated at 708 may be identified as a next feature to be processed. For example, allocation component 208 of FIG. 2 may identify a next feature to be processed from among those comprised in ordered unified feature list 232. In various embodiments, the feature identified at 710 may comprise the first feature in the ordered unified feature list that has not already been processed. In some embodiments, when flow passes from 708 to 710, no features in the ordered unified feature list may yet have been processed, and thus the feature identified at 710 may simply be the first feature in the ordered unified feature list. At 712, a remaining resource pool may be pruned based on a feature-specific resource subset corresponding to the feature identified at 710. For example, allocation component 208 of FIG. 2 may prune a remaining resource pool based on a feature-specific resource subset 224 corresponding to an identified feature among those of ordered unified feature list 232. In various embodiments, the pruning at 712 may comprise computing an intersection of the feature-specific resource subset for the feature identified at 710 with the remaining resource pool. In some embodiments, the first time flow passes to 712, the remaining resource pool may comprise the available resource pool identified at 704. For example, pruning that allocation component 208 of FIG. 2 performs based on a first feature in ordered unified feature list 232 may comprise computing an intersection of the feature-specific resource subset 224 for the first feature in ordered unified feature list 232 with available resource pool 234.

At 714, a determination may be made of whether any features remain to be processed from among those comprised in the ordered unified feature list. For example, after pruning available resource pool 234 based on a feature-specific resource subset 224 for a first feature in ordered unified feature list 232, allocation component 208 of FIG. 2 may determine whether ordered unified feature list 232 comprises any additional features to be processed. If it is determined at 714 that one or more features remain to be processed, flow may return to 710, where a next feature to be processed may be identified from among those in the ordered unified feature list. Flow may then pass again to 712, where the remaining resource pool may be pruned based on a feature-specific resource subset corresponding to that next feature. During this and each subsequent iteration, the remaining resource pool that is pruned at 712 may comprise the pruned pool that was generated at 712 during the preceding iteration. For example, pruning that allocation component 208 of FIG. 2 performs based on a second feature in ordered unified feature list 232 may comprise computing an intersection of a feature-specific resource subset 224 for a second feature in ordered unified feature list 232 with a remaining resource pool that it previously computed as an intersection of a feature-specific resource subset 224 for a first feature in ordered unified feature list 232 with available resource pool 234.

Following a determination at 714 that no features remain to be processed, flow may pass to 716. At 716, a candidate resource set may be identified as the set of resources comprised in the remaining resource pool. For example, after iteratively pruning available resource pool 234 using one or more feature-specific resource subsets 224 corresponding to one or more respective features specified in ordered unified feature list 232, allocation component 208 of FIG. 2 may identify candidate resource set 236 as the set of resources of available resource pool 234 that remain following the iterative pruning. From 716, flow may pass to 718, where one or more resources may be selected for allocation from among those in the candidate resource set identified at 716. For example, allocation component 208 of FIG. 2 may select, from among candidate resource set 236, one or more resources to be allocated for use to provide a virtual appliance service to user device 112. The embodiments are not limited to these examples.

Returning to FIG. 2, in various embodiments, allocation component 208 may be operative to allocate cloud resources in accordance with the provisions of an applicable SLA. More particularly, in some embodiments, in conjunction with the provision of a virtual appliance service at a particular SLA service level, allocation component 208 may be operative to allocate resources in such fashion as to satisfy the terms governing that service level. In various embodiments, subscription to a given service level may entitle the subscriber to the use of resources possessing particular features, and allocation component 208 may allocate resources possessing those features for use in providing a virtual appliance service to the subscriber. In some embodiments, allocation component 208 may observe the provisions of an applicable SLA or SLA service level by allocating resources using one or more feature-specific resource subsets 224 and associated feature-specific resource counts 226 to which that SLA or SLA service level maps. In various embodiments, allocation component 208 may prune available resource pool 234 based on such feature-specific resource subsets 224 and feature-specific resource counts 226 in order to allocate resources in compliance with the terms of an applicable SLA or SLA service level. The embodiments are not limited in this context.

In some embodiments, one or more of the features to be provided according to a given SLA or SLA service level may comprise compound features. For example, a subscriber to a Gold service level may be entitled to the use of a compute resource that possesses a compound feature corresponding to the possession of either a dual-core or quad-core architecture. In various embodiments, in order to identify resources possessing a compound feature stipulated by an SLA or SLA service level, allocation component 208 may prune available resource pool 234 based on a feature-specific resource subset 224 and associated feature-specific resource count 226 corresponding to that compound feature. In the context of the previous example, administration component 206 may maintain a feature-specific resource subset 224 that identifies compute resources possessing dual-core or quad-core architectures, and allocation component 208 may use that feature-specific resource subset 224 and its associated feature-specific resource count 226 to prune available resource pool 234. In some embodiments, allocation component 208 may be operative to dynamically generate feature-specific resource subsets 224 and feature-specific resource counts 226 for compound features as needed during resource allocation, based on feature-specific resource subsets 224 and feature-specific resource counts 226 that administration component 206 maintains for non-compound features. The embodiments are not limited in this context.

In various embodiments, an applicable SLA or SLA service level may specify that a virtual appliance service is to be provided with high availability, such as "five nines" (99.999%) availability, for example. In some embodiments, in order to enable a given virtual appliance service to be provided with high availability, allocation component 208 may be operative to allocate respective resource sets for multiple instances of that virtual appliance service. In various embodiments, allocation component 208 may be operative to allocate such resource sets such that they differ from each other with respect to physical location. For example, allocation component 208 may allocate a first resource set that comprises resources located in a first facility, and may allocate a second resource set that comprises resources located in a second facility that is remote from the first facility. In another example, allocation component 208 may allocate a first resource set that comprises resources located on a first device rack, and may allocate a second resource set that comprises resources located on a second device rack. The embodiments are not limited to these examples.

In some embodiments, in order to enable such consideration of physical location during resource allocation, administration component 206 may define and track physical location features in conjunction with maintaining cloud resource information database 210. In various embodiments, administration component 206 may maintain feature-specific resource subsets 224 corresponding to location features on various scales, such as particular racks/clusters of devices, rooms, floors, facilities, municipalities, states, provinces, territories, and countries. In some embodiments, administration component 206 may maintain a respective feature-specific resource count 226 for each such feature-specific resource subset 224, the feature-specific resource count 226 indicating a number of resources that are located at/within the location corresponding to its associated feature-specific resource subset 224. In various embodiments, administration component 206 may be operative to generate one or more sibling feature sets 222 that comprise sibling location features. The embodiments are not limited in this context.

In some embodiments, when allocating resources in support of high-availability SLAs, allocation component 208 may be operative to consider location constraints after it has pruned available resource pool 234 according to any other features identified in feature preference information 230. In various embodiments, feature preference information 230 may specify a desired location for the resources used to provide an instance of the virtual appliance service. In such embodiments, allocation component 208 may allocate resources at/within that location to one instance of the virtual appliance service, and may allocate resources at/within one or more other locations to one or more additional instances of the virtual appliance service. In some other embodiments, feature preference information 230 may not specify any desired location. In such embodiments, allocation component 208 may determine a location at/within which the greatest number of resources among pruned available resource pool 234 are located and may allocate resources at/within that location to one instance of the virtual appliance service. Allocation component 208 may then allocate resources at/within one or more other locations to one or more additional instances of the virtual appliance service. The embodiments are not limited in this context.

It is worthy of note that in various embodiments, some defined features may indicate characteristics that may reasonably be expected to fluctuate, such as resource proximities or resource capacities such as network connection bandwidth. In some embodiments, rather than using statically-maintained feature-specific resource subsets 224 and feature-specific resource counts 226 to prune based on such features, apparatus 200 may dynamically analyze heterogeneous resource cloud 104 upon receipt of resource allocation request 228 in order to determine the resources that possess those features at that time. The embodiments are not limited in this context.

Figure 8:
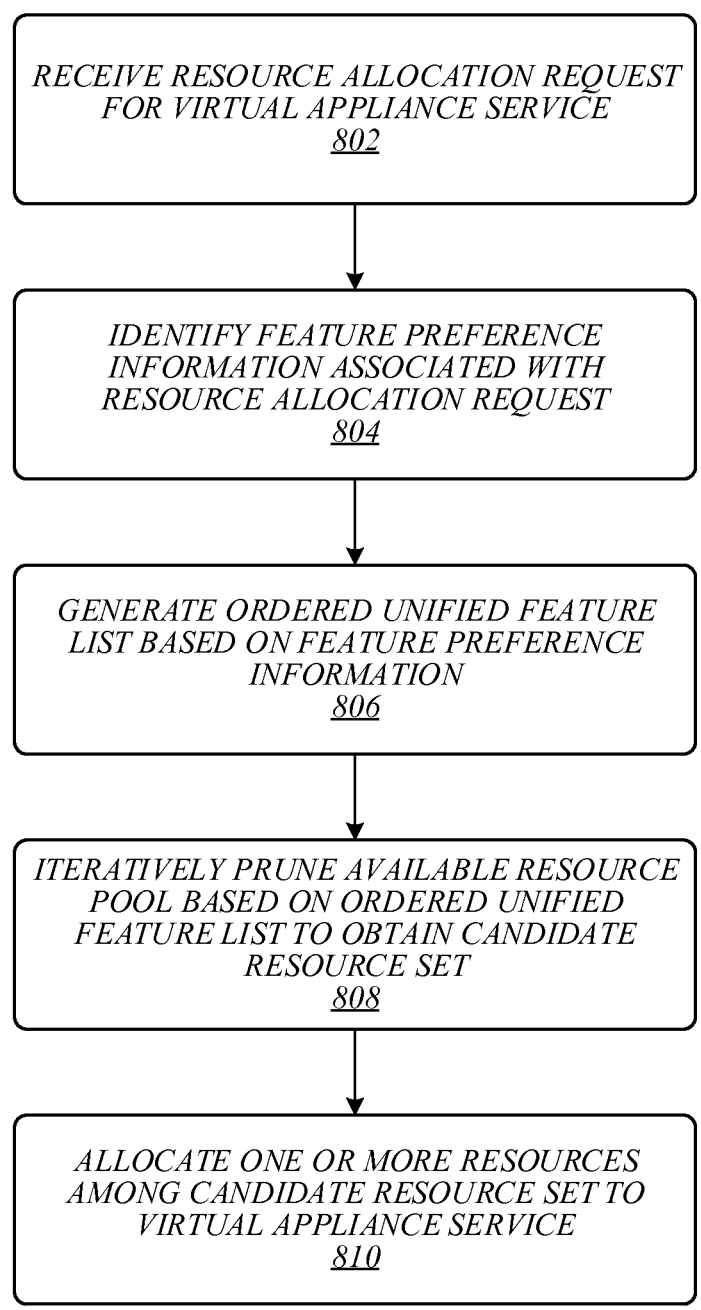
FIG. 8 illustrates an embodiment of a fifth logic flow.

FIG. 8 illustrates an example of a logic flow 800 that may be representative of operations that may be performed in conjunction with the application of resource management techniques for heterogeneous resource clouds in various embodiments. For example, logic flow 800 may be representative of operations that may be performed in some embodiments by resource management server 102 of FIG. 1 and/or apparatus 200 of FIG. 2. As shown in FIG. 8, a resource allocation request for a virtual appliance service may be received at 802. For example, apparatus 200 of FIG. 2 may receive resource allocation request 228. At 804, feature preference information associated with the resource allocation request may be identified. For example, allocation component 208 of FIG. 2 may identify feature preference information 230.

At 806, an ordered unified feature list may be generated based on the feature preference information. For example, allocation component 208 of FIG. 2 may generate ordered unified feature list 232 based on feature preference information 230. At 808, an available resource pool may be iteratively pruned based on the ordered unified feature list in order to obtain a candidate resource set. For example, allocation component 208 of FIG. 2 may iteratively prune an available resource pool 234 based on an ordered unified feature list 232 to obtain a candidate resource set 236. At 810, one or more resources among the candidate resource set may be allocated to a virtual appliance service. For example, allocation component 208 of FIG. 2 may allocated one or more resources among a candidate resource set 236 to a virtual appliance service to be provided to user device 112. The embodiments are not limited to these examples.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flow 300 of FIG. 3, logic flow 400 of FIG. 4, logic flow 500 of FIG. 5, logic flow 700 of FIG. 7, and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
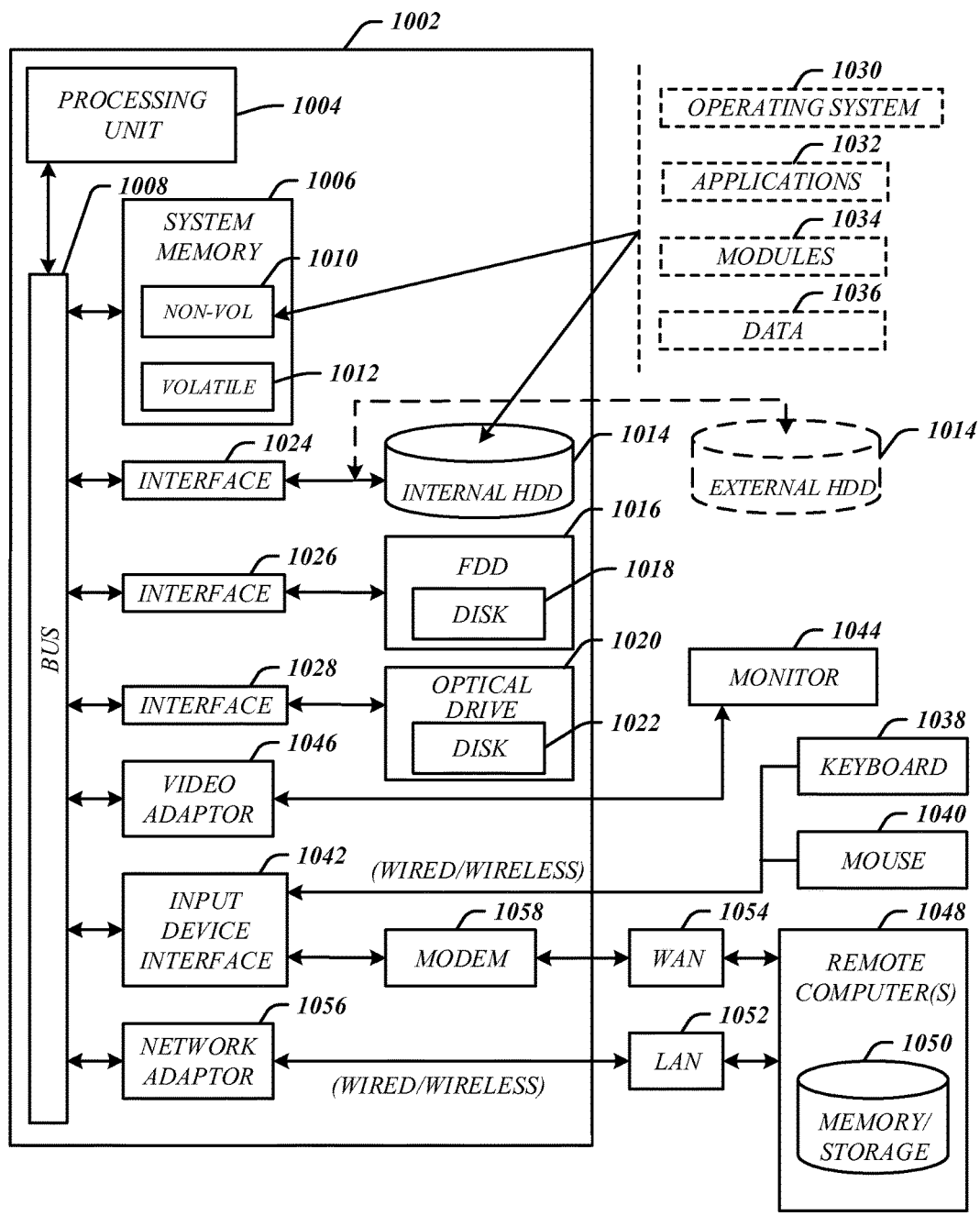
FIG. 10 illustrates an embodiment a computing architecture.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of resource management server 102 of FIG. 1 and/or apparatus 200 of FIG. 2. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of resource management server 102 of FIG. 1 and/or apparatus 200 of FIG. 2.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
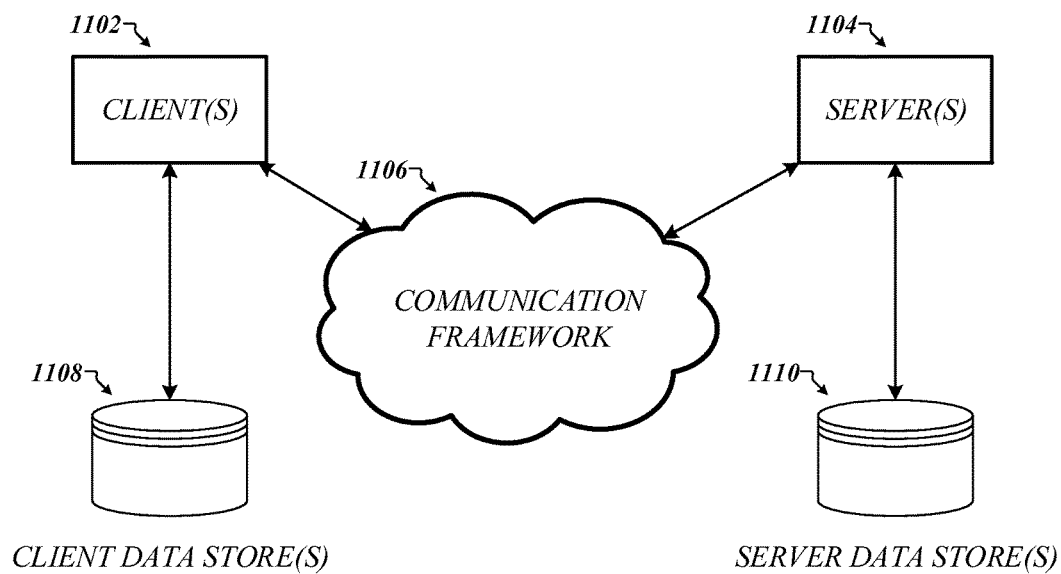
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 and the servers 1104 are operatively connected to one or more respective client data stores 1108 and server data stores 1110 that can be employed to store information local to the respective clients 1102 and servers 1104, such as cookies and/or associated contextual information. Any one of clients 1102 and/or servers 1104 may implement one or more of resource management server 102 of FIG. 1, apparatus 200 of FIG. 2, logic flow 300 of FIG. 3, logic flow 400 of FIG. 4, logic flow 500 of FIG. 5, logic flow 700 of FIG. 7, logic flow 800 of FIG. 8, storage medium 900 of FIG. 9, and computing architecture 1000 of FIG. 10.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is at least one non-transitory computer-readable storage medium comprising a set of instructions that, in response to being executed on a computing device, cause the computing device to generate an ordered unified feature list based on feature preference information associated with a request for a virtual appliance service, iteratively prune an available resource pool of a heterogeneous resource cloud based on the ordered unified feature list to obtain a candidate resource set, and allocate one or more resources among the candidate resource set to the virtual appliance service.

Example 2 is the at least one non-transitory computer-readable storage medium of Example 1, comprising instructions that, in response to being executed on the computing device, cause the computing device to identify a plurality of desired features based on the feature preference information, and generate the ordered unified feature list by sorting the plurality of desired features in order of relative scarcity.

Example 3 is the at least one non-transitory computer-readable storage medium of Example 2, comprising instructions that, in response to being executed on the computing device, cause the computing device to identify at least one of the plurality of desired features based on a service level agreement (SLA) applicable to the virtual appliance service.

Example 4 is the at least one non-transitory computer-readable storage medium of Example 3, the virtual appliance to be provided with high availability according to the SLA.

Example 5 is the at least one non-transitory computer-readable storage medium of Example 4, comprising instructions that, in response to being executed on the computing device, cause the computing device to allocate respective resource sets for multiple instances of the virtual appliance service, the resource sets to differ from each other with respect to physical location.

Example 6 is the at least one non-transitory computer-readable storage medium of Example 5, comprising instructions that, in response to being executed on the computing device, cause the computing device to allocate the respective resource sets using one or more feature-specific resource subsets corresponding to physical location features.

Example 7 is the at least one non-transitory computer-readable storage medium of Example 5, comprising instructions that, in response to being executed on the computing device, cause the computing device to allocate the respective resource sets using one or more sibling feature sets comprising sibling physical location features.

Example 8 is the at least one non-transitory computer-readable storage medium of Example 1, the iterative pruning of the available resource pool to include identifying a first feature of the ordered unified feature list, identifying a first feature-specific resource subset corresponding to the first feature, and determining a first pruned resource pool as an intersection of the available resource pool and the first feature-specific resource subset.

Example 9 is the at least one non-transitory computer-readable storage medium of Example 8, the iterative pruning of the available resource pool to include identifying a second feature of the ordered unified feature list, identifying a second feature-specific resource subset corresponding to the second feature, and determining a second pruned resource pool as an intersection of the first pruned resource pool and the second feature-specific resource subset.

Example 10 is the at least one non-transitory computer-readable storage medium of Example 1, comprising instructions that, in response to being executed on the computing device, cause the computing device to allocate respective resources for multiple instances of the virtual appliance service.

Example 11 is the at least one non-transitory computer-readable storage medium of Example 1, comprising instructions that, in response to being executed on the computing device, cause the computing device to iteratively prune multiple available resource pools of the heterogeneous resource cloud to obtain multiple candidate resource sets, each of the multiple candidate resource sets to comprise resources of a different respective type, and allocate at least one respective resource among each of the multiple candidate resource sets to the virtual appliance service.

Example 12 is the at least one non-transitory computer-readable storage medium of Example 1, the one or more resources to include at least one of a compute resource, a storage resource, and a networking resource.

Example 13 is the at least one non-transitory computer-readable storage medium of Example 1, comprising instructions that, in response to being executed on the computing device, cause the computing device to maintain an overall resource count for the heterogeneous resource cloud.

Example 14 is the at least one non-transitory computer-readable storage medium of Example 13, comprising instructions that, in response to being executed on the computing device, cause the computing device to increment the overall resource count in response to receipt of a notification of an addition of a new resource to the heterogeneous resource cloud, and assign a resource identifier (ID) to the new resource based on the incremented overall resource count.

Example 15 is the at least one non-transitory computer-readable storage medium of Example 14, comprising instructions that, in response to being executed on the computing device, cause the computing device to identify a feature of the new resource, insert the resource ID into a feature-specific resource subset for the identified feature, and increment a feature-specific resource count for the identified feature.

Example 16 is the at least one non-transitory computer-readable storage medium of Example 15, comprising instructions that, in response to being executed on the computing device, cause the computing device to perform a feature registration procedure to register the identified feature in response to a determination that the identified feature has not previously been registered.

Example 17 is an apparatus, comprising logic, at least a portion of which is implemented in hardware, the logic to comprise an administration component to maintain a cloud resource information database for a heterogeneous resource cloud, and an allocation component to generate an ordered unified feature list based on feature preference information associated with a request for a virtual appliance service, iteratively prune an available resource pool of the heterogeneous resource cloud based on the ordered unified feature list to obtain a candidate resource set, and allocate one or more resources among the candidate resource set to the virtual appliance service.

Example 18 is the apparatus of Example 17, the allocation component to identify a plurality of desired features based on the feature preference information and generate the ordered unified feature list by sorting the plurality of desired features in order of relative scarcity.

Example 19 is the apparatus of Example 18, the allocation component to identify at least one of the plurality of desired features based on a service level agreement (SLA) applicable to the virtual appliance service.

Example 20 is the apparatus of Example 19, the virtual appliance to be provided with high availability according to the SLA.

Example 21 is the apparatus of Example 20, the logic to allocate respective resource sets for multiple instances of the virtual appliance service, the resource sets to differ from each other with respect to physical location.

Example 22 is the apparatus of Example 21, the logic to allocate the respective resource sets using one or more feature-specific resource subsets corresponding to physical location features.

Example 23 is the apparatus of Example 21, the logic to allocate the respective resource sets using one or more sibling feature sets comprising sibling physical location features.

Example 24 is the apparatus of Example 17, the iterative pruning of the available resource pool to include identifying a first feature of the ordered unified feature list, identifying a first feature-specific resource subset corresponding to the first feature, and determining a first pruned resource pool as an intersection of the available resource pool and the first feature-specific resource subset.

Example 25 is the apparatus of Example 24, the iterative pruning of the available resource pool to include identifying a second feature of the ordered unified feature list, identifying a second feature-specific resource subset corresponding to the second feature, and determining a second pruned resource pool as an intersection of the first pruned resource pool and the second feature-specific resource subset.

Example 26 is the apparatus of Example 17, the allocation component to allocate respective resources for multiple instances of the virtual appliance service.

Example 27 is the apparatus of Example 17, the allocation component to iteratively prune multiple available resource pools of the heterogeneous resource cloud to obtain multiple candidate resource sets, each of the multiple candidate resource sets to comprise resources of a different respective type, the allocation component to allocate at least one respective resource among each of the multiple candidate resource sets to the virtual appliance service.

Example 28 is the apparatus of Example 17, the one or more resources to include at least one of a compute resource, a storage resource, and a networking resource.

Example 29 is the apparatus of Example 17, the logic to maintain an overall resource count for the heterogeneous resource cloud.

Example 30 is the apparatus of Example 29, the logic to increment the overall resource count in response to receipt of a notification of an addition of a new resource to the heterogeneous resource cloud and assign a resource identifier (ID) to the new resource based on the incremented overall resource count.

Example 31 is the apparatus of Example 30, the logic to identify a feature of the new resource, insert the resource ID into a feature-specific resource subset for the identified feature, and increment a feature-specific resource count for the identified feature.

Example 32 is the apparatus of Example 31, the logic to perform a feature registration procedure to register the identified feature in response to a determination that the identified feature has not previously been registered.

Example 33 is a system, comprising an apparatus according to any of Examples 17 to 32, at least one memory unit, and at least one network interface.

Example 34 is a method, comprising generating, by a processor circuit, an ordered unified feature list based on feature preference information associated with a request for a virtual appliance service, iteratively pruning an available resource pool of a heterogeneous resource cloud based on the ordered unified feature list to obtain a candidate resource set, and allocating one or more resources among the candidate resource set to the virtual appliance service.

Example 35 is the method of Example 34, comprising identifying a plurality of desired features based on the feature preference information, and generating the ordered unified feature list by sorting the plurality of desired features in order of relative scarcity.

Example 36 is the method of Example 35, comprising identifying at least one of the plurality of desired features based on a service level agreement (SLA) applicable to the virtual appliance service.

Example 37 is the method of Example 36, the virtual appliance to be provided with high availability according to the SLA.

Example 38 is the method of Example 37, comprising allocating respective resource sets for multiple instances of the virtual appliance service, the resource sets to differ from each other with respect to physical location.

Example 39 is the method of Example 38, comprising allocating the respective resource sets using one or more feature-specific resource subsets corresponding to physical location features.

Example 40 is the method of Example 38, comprising allocating the respective resource sets using one or more sibling feature sets comprising sibling physical location features.

Example 41 is the method of Example 34, the iterative pruning of the available resource pool to include identifying a first feature of the ordered unified feature list, identifying a first feature-specific resource subset corresponding to the first feature, and determining a first pruned resource pool as an intersection of the available resource pool and the first feature-specific resource subset.

Example 42 is the method of Example 41, the iterative pruning of the available resource pool to include identifying a second feature of the ordered unified feature list, identifying a second feature-specific resource subset corresponding to the second feature, and determining a second pruned resource pool as an intersection of the first pruned resource pool and the second feature-specific resource subset.

Example 43 is the method of Example 34, comprising allocating respective resources for multiple instances of the virtual appliance service.

Example 44 is the method of Example 34, comprising iteratively pruning multiple available resource pools of the heterogeneous resource cloud to obtain multiple candidate resource sets, each of the multiple candidate resource sets to comprise resources of a different respective type, and allocating at least one respective resource among each of the multiple candidate resource sets to the virtual appliance service.

Example 45 is the method of Example 34, the one or more resources to include at least one of a compute resource, a storage resource, and a networking resource.

Example 46 is the method of Example 34, comprising maintaining an overall resource count for the heterogeneous resource cloud.

Example 47 is the method of Example 46, comprising incrementing the overall resource count in response to receipt of a notification of an addition of a new resource to the heterogeneous resource cloud, and assigning a resource identifier (ID) to the new resource based on the incremented overall resource count.

Example 48 is the method of Example 47, comprising identifying a feature of the new resource, inserting the resource ID into a feature-specific resource subset for the identified feature, and incrementing a feature-specific resource count for the identified feature.

Example 49 is the method of Example 48, comprising performing a feature registration procedure to register the identified feature in response to a determination that the identified feature has not previously been registered.

Example 50 is at least one non-transitory computer-readable storage medium comprising a set of instructions that, in response to being executed on a computing device, cause the computing device to perform a method according to any of Examples 34 to 49.

Example 51 is an apparatus, comprising means for performing a method according to any of Examples 34 to 49.

Example 52 is a system, comprising the apparatus of Example 51, at least one memory unit, and at least one network interface.

Example 53 is an apparatus, comprising means for generating an ordered unified feature list based on feature preference information associated with a request for a virtual appliance service, means for iteratively pruning an available resource pool of a heterogeneous resource cloud based on the ordered unified feature list to obtain a candidate resource set, and means for allocating one or more resources among the candidate resource set to the virtual appliance service.

Example 54 is the apparatus of Example 53, comprising means for identifying a plurality of desired features based on the feature preference information, and means for generating the ordered unified feature list by sorting the plurality of desired features in order of relative scarcity.

Example 55 is the apparatus of Example 54, comprising means for identifying at least one of the plurality of desired features based on a service level agreement (SLA) applicable to the virtual appliance service.

Example 56 is the apparatus of Example 55, the virtual appliance to be provided with high availability according to the SLA.

Example 57 is the apparatus of Example 56, comprising means for allocating respective resource sets for multiple instances of the virtual appliance service, the resource sets to differ from each other with respect to physical location.

Example 58 is the apparatus of Example 57, comprising means for allocating the respective resource sets using one or more feature-specific resource subsets corresponding to physical location features.

Example 59 is the apparatus of Example 57, comprising means for allocating the respective resource sets using one or more sibling feature sets comprising sibling physical location features.

Example 60 is the apparatus of Example 53, the iterative pruning of the available resource pool to include identifying a first feature of the ordered unified feature list, identifying a first feature-specific resource subset corresponding to the first feature, and determining a first pruned resource pool as an intersection of the available resource pool and the first feature-specific resource subset.

Example 61 is the apparatus of Example 60, the iterative pruning of the available resource pool to include identifying a second feature of the ordered unified feature list, identifying a second feature-specific resource subset corresponding to the second feature, and determining a second pruned resource pool as an intersection of the first pruned resource pool and the second feature-specific resource subset.

Example 62 is the apparatus of Example 53, comprising means for allocating respective resources for multiple instances of the virtual appliance service.

Example 63 is the apparatus of Example 53, comprising means for iteratively pruning multiple available resource pools of the heterogeneous resource cloud to obtain multiple candidate resource sets, each of the multiple candidate resource sets to comprise resources of a different respective type, and means for allocating at least one respective resource among each of the multiple candidate resource sets to the virtual appliance service.

Example 64 is the apparatus of Example 53, the one or more resources to include at least one of a compute resource, a storage resource, and a networking resource.

Example 65 is the apparatus of Example 53, comprising means for maintaining an overall resource count for the heterogeneous resource cloud.

Example 66 is the apparatus of Example 65, comprising means for incrementing the overall resource count in response to receipt of a notification of an addition of a new resource to the heterogeneous resource cloud, and means for assigning a resource identifier (ID) to the new resource based on the incremented overall resource count.

Example 67 is the apparatus of Example 66, comprising means for identifying a feature of the new resource, means for inserting the resource ID into a feature-specific resource subset for the identified feature, and means for incrementing a feature-specific resource count for the identified feature.

Example 68 is the apparatus of Example 67, comprising means for performing a feature registration procedure to register the identified feature in response to a determination that the identified feature has not previously been registered.

Example 69 is a system, comprising an apparatus according to any of Examples 53 to 68, at least one memory unit, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory computer-readable storage medium comprising a set of instructions that, in response to being executed on a computing device, cause the computing device to:
   receive, from a virtual appliance service (VAS) account manager, a resource allocation request, the resource allocation request received in response to a request for a VAS from a user device, the request for the VAS comprising an indication of feature preference information, the feature preference information comprising information for identifying one or more feature preferences applicable to a prospective resource to be used to provide the VAS in a heterogeneous resource cloud;
   generate an ordered unified feature list based on the feature preference information associated with the request for the VAS;
   identify a plurality of desired features based on the feature preference information;
   generate the ordered unified feature list by sorting the plurality of desired features in order of a respective count of each feature of the plurality of desired features in the heterogenous resource cloud;
   iteratively prune an available resource pool of the heterogeneous resource cloud based on the ordered unified feature list to obtain a candidate resource set, the candidate resource set to be obtained based on unique identifiers of one or more resources of the available resource pool and unique identifiers of one or more resources that possess a first feature of the ordered unified feature list; and
   allocate one or more resources among the candidate resource set to the VAS for use by the user device.

2. The at least one non-transitory computer-readable storage medium of claim 1, comprising instructions that, in response to being executed on the computing device, cause the computing device to identify at least one of the plurality of desired features based on a service level agreement (SLA) applicable to the VAS, wherein the count of each feature is based on a count of resources in the heterogeneous resource cloud that possess the corresponding feature.

3. The at least one non-transitory computer-readable storage medium of claim 1, the iterative pruning of the available resource pool to include:
   identifying the first feature of the ordered unified feature list;
   identifying a first feature-specific resource subset comprising unique identifiers of the one or more resources that possess the first feature; and
   determining a first pruned resource pool as an intersection of the unique identifiers of the available resource pool and the unique identifiers of the first feature-specific resource subset.

4. The at least one non-transitory computer-readable storage medium of claim 3, the iterative pruning of the available resource pool to include:
   identifying a second feature of the ordered unified feature list;
   identifying a second feature-specific resource subset comprising unique identifiers of one or more resources that possess the second feature; and determining a second pruned resource pool as an intersection of the unique identifiers of the first pruned resource pool and the unique identifiers of the second feature-specific resource subset, wherein a compound feature comprises the first and second features.

5. The at least one non-transitory computer-readable storage medium of claim 1, comprising instructions that, in response to being executed on the computing device, cause the computing device to allocate respective resources for multiple instances of the VAS.

6. The at least one non-transitory computer-readable storage medium of claim 1, comprising instructions that, in response to being executed on the computing device, cause the computing device to:
iteratively prune multiple available resource pools of the heterogeneous resource cloud to obtain multiple candidate resource sets, each of the multiple candidate resource sets to comprise resources of a different respective type; and
allocate at least one respective resource among each of the multiple candidate resource sets to the VAS.

7. The at least one non-transitory computer-readable storage medium of claim 1, the one or more resources to include at least one of a compute resource, a storage resource, and a networking resource.

8. An apparatus, comprising:
logic, at least a portion of which is implemented in hardware, the logic to comprise:
an administration component to maintain a cloud resource information database for a heterogeneous resource cloud, and receive, from a virtual appliance service (VAS) account manager, a resource allocation request, the resource allocation request received in response to a request for a VAS from a user device, the request for the VAS comprising an indication of feature preference information, the feature preference information comprising information for identifying one or more feature preferences applicable to a prospective resource to be used to provide the VAS in the heterogeneous resource cloud; and
an allocation component to:
generate an ordered unified feature list based on feature preference information associated with the request for the VAS,
identify a plurality of desired features based on the feature preference information and generate the ordered unified feature list by sorting the plurality of desired features in order of a respective count of each feature of the plurality of desired features in the heterogenous resource cloud,
iteratively prune an available resource pool of the heterogeneous resource cloud based on the ordered unified feature list to obtain a candidate resource set, the candidate resource set to be obtained based on unique identifiers of one or more resources of the available resource pool and unique identifiers of one or more resources that possess a first feature of the ordered unified feature list, and
allocate one or more resources among the candidate resource set to the VAS for use by the user device.

9. The apparatus of claim 8, the allocation component to identify at least one of the plurality of desired features based on a service level agreement (SLA) applicable to the VAS, wherein the count of each feature is based on a count of resources in the heterogeneous resource cloud that possess the corresponding feature.

10. The apparatus of claim 8, the available resource pool comprising unique identifiers of one or more resources available for allocation, the iterative pruning of the available resource pool to include:
identifying the first feature of the ordered unified feature list;
identifying a first feature-specific resource subset comprising unique identifiers of the one or more resources that possess the first feature; and
determining a first pruned resource pool as an intersection of the unique identifiers of the available resource pool and the unique identifiers of the first feature-specific resource subset.

11. The apparatus of claim 10, the iterative pruning of the available resource pool to include:
identifying a second feature of the ordered unified feature list;
identifying a second feature-specific resource subset comprising unique identifiers of one or more resources that possess the second feature; and
determining a second pruned resource pool as an intersection of the unique identifiers of the first pruned resource pool and the unique identifiers of the second feature-specific resource subset, wherein a compound feature comprises the first and second features.

12. The apparatus of claim 8, the allocation component to allocate respective resources for multiple instances of the VAS.

13. The apparatus of claim 8, the allocation component to iteratively prune multiple available resource pools of the heterogeneous resource cloud to obtain multiple candidate resource sets, each of the multiple candidate resource sets to comprise resources of a different respective type, the allocation component to allocate at least one respective resource among each of the multiple candidate resource sets to the VAS.

14. The apparatus of claim 8, the one or more resources to include at least one of a compute resource, a storage resource, and a networking resource.

15. A system, comprising:
the apparatus of claim 8;
at least one memory unit; and
at least one network interface.

16. A method, comprising:
receive, from a virtual appliance service (VAS) account manager, a resource allocation request, the resource allocation request received in response to a request for a VAS from a user device, the request for the VAS comprising an indication of feature preference information, the feature preference information comprising information for identifying one or more feature preferences applicable to a prospective resource to be used to provide the VAS in a heterogeneous resource cloud;
generating, by a processor circuit, an ordered unified feature list based on feature preference information associated with the request for the VAS;
identifying a plurality of desired features based on the feature preference information;
generating the ordered unified feature list by sorting the plurality of desired features in order of a respective count of each feature of the plurality of desired features in the heterogenous resource cloud;
iteratively pruning an available resource pool of the heterogeneous resource cloud based on the ordered unified feature list to obtain a candidate resource set, the candidate resource set to be obtained based on unique identifiers of one or more resources of the available resource pool and unique identifiers of one or more resources that possess a first feature of the ordered unified feature list; and allocating one or more resources among the candidate resource set to the VAS for use by the user device.

17. The method of claim 16, comprising identifying at least one of the plurality of desired features based on a service level agreement (SLA) applicable to the VAS, wherein the count of each feature is based on a count of resources in the heterogeneous resource cloud that possess the corresponding feature.

18. The method of claim 16, the available resource pool comprising unique identifiers of one or more resources available for allocation, the iterative pruning of the available resource pool to include:

identifying the first feature of the ordered unified feature list;

identifying a first feature-specific resource subset comprising unique identifiers of the one or more resources that possess the first feature; and determining a first pruned resource pool as an intersection of the unique identifiers of the available resource pool and the unique identifiers of the first feature-specific resource subset.

19. The method of claim 18, the iterative pruning of the available resource pool to include:

identifying a second feature of the ordered unified feature list;

identifying a second feature-specific resource subset comprising unique identifiers of one or more resources that possess the second feature; and determining a second pruned resource pool as an intersection of the unique identifiers of the first pruned resource pool and the unique identifiers of the second feature-specific resource subset, wherein a compound feature comprises the first and second features.

20. The method of claim 16, comprising allocating respective resources for multiple instances of the VAS.

21. The method of claim 16, comprising:

iteratively pruning multiple available resource pools of the heterogeneous resource cloud to obtain multiple candidate resource sets, each of the multiple candidate resource sets to comprise resources of a different respective type; and allocating at least one respective resource among each of the multiple candidate resource sets to the VAS.

22. The method of claim 16, the one or more resources to include at least one of a compute resource, a storage resource, and a networking resource.

* * * * *